(12) United States Patent
Okamoto et al.

(10) Patent No.: US 7,646,125 B2
(45) Date of Patent: Jan. 12, 2010

(54) ELECTRIC MOTOR ROTOR AND METHOD OF MANUFACTURING THE SAME

(75) Inventors: Takashi Okamoto, Yamanashi (JP);
Takuya Maeda, Yamanashi (JP);
Makoto Funakubo, Yamanashi (JP);
Takeshi Tamaki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/613,833

(22) Filed: Dec. 20, 2006

(65) Prior Publication Data

US 2007/0145849 A1   Jun. 28, 2007

(30) Foreign Application Priority Data

Dec. 22, 2005   (JP)   ............... 2005-370209

(51) Int. Cl.
H02K 12/21   (2006.01)
(52) U.S. Cl. .................... 310/156.53; 310/156.58; 310/156.78; 310/156.56; 310/156.62
(58) Field of Classification Search ............ 310/156.53, 310/156.56, 156.58, 156.62, 156.78
See application file for complete search history.

(56) References Cited

U.S. PATENT DOCUMENTS

| | | | | | |
|---|---|---|---|---|---|
| 2,059,518 | A | * | 11/1936 | Harley ................... | 310/156.53 |
| 5,159,220 | A | * | 10/1992 | Kliman .................. | 310/156.56 |
| 5,369,325 | A | * | 11/1994 | Nagate et al. .......... | 310/156.54 |
| 5,508,576 | A | * | 4/1996 | Nagate et al. .......... | 310/156.54 |
| 5,666,015 | A | * | 9/1997 | Uchibori et al. ............. | 310/261 |
| 5,864,191 | A | * | 1/1999 | Nagate et al. .......... | 310/156.54 |
| 6,011,339 | A | * | 1/2000 | Kawakami .................. | 310/208 |
| 6,630,762 | B2 | * | 10/2003 | Naito et al. ............ | 310/156.53 |
| 6,700,247 | B2 | * | 3/2004 | Masuzawa et al. ............ | 310/80 |
| 2002/0070620 | A1 | * | 6/2002 | Naito et al. ............ | 310/156.56 |
| 2004/0169431 | A1 | * | 9/2004 | Sasaki et al. ................ | 310/211 |

(Continued)

FOREIGN PATENT DOCUMENTS

JP   05056583   A   *   3/1993

(Continued)

OTHER PUBLICATIONS

European Search Report for EP 06 06 6298 mailed May 31, 2007.

(Continued)

*Primary Examiner*—Quyen Leung
*Assistant Examiner*—Naishadh N Desai
(74) *Attorney, Agent, or Firm*—Lowe Hauptman Ham & Berner, LLP

(57) ABSTRACT

A rotor of an electric motor, including a rotor core having a plurality of magnet-retaining apertures, a plurality of permanent magnets individually received and retained in the magnet-retaining apertures of the rotor core, and a resinous filler filling a gap defined between each magnet-retaining aperture and each permanent magnet and fixing the permanent magnets to the magnet-retaining apertures. The rotor also includes an engaging projection provided in the rotor core, the engaging projection tightly engaged with each of the permanent magnets received in the magnet-retaining apertures and temporarily holding each permanent magnet at a predetermined position in a corresponding magnet-retaining aperture, in an unfinished state of the rotor where the resinous filler is not arranged in the gap.

5 Claims, 7 Drawing Sheets

U.S. PATENT DOCUMENTS

| | | | |
|---|---|---|---|
| 2005/0121990 A1* | 6/2005 | Kaneko | 310/156.47 |
| 2005/0156474 A1* | 7/2005 | Endo | 310/156.53 |
| 2006/0284508 A1* | 12/2006 | Tajima et al. | 310/156.53 |

FOREIGN PATENT DOCUMENTS

| | | |
|---|---|---|
| JP | 5-83892 A | 4/1993 |
| JP | 05236684 A1 | 9/1993 |
| JP | 11-355985 A | 12/1999 |
| JP | 2000-8334 A | 3/2000 |
| JP | 2000184638 A1 | 6/2000 |
| JP | 2001157394 A * | 6/2001 |
| JP | 2001157394 A1 | 6/2001 |
| JP | 2002-247784 A | 8/2002 |
| JP | 2005-6372 A | 1/2005 |
| WO | 0300531 A1 | 1/2003 |

OTHER PUBLICATIONS

Notice of Reasons for Rejection for JP 2005-370209 mailed Sep. 4, 2007.

* cited by examiner

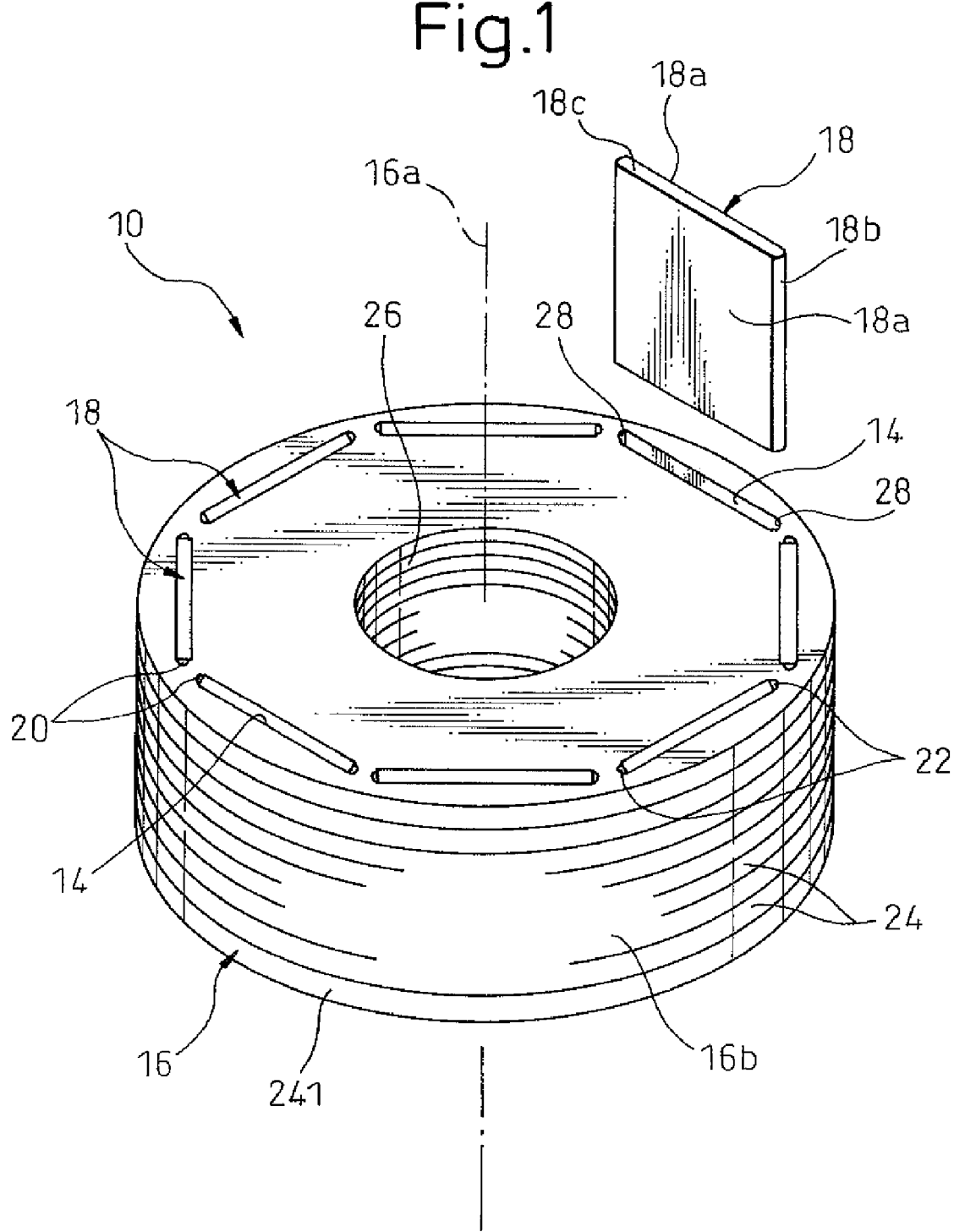

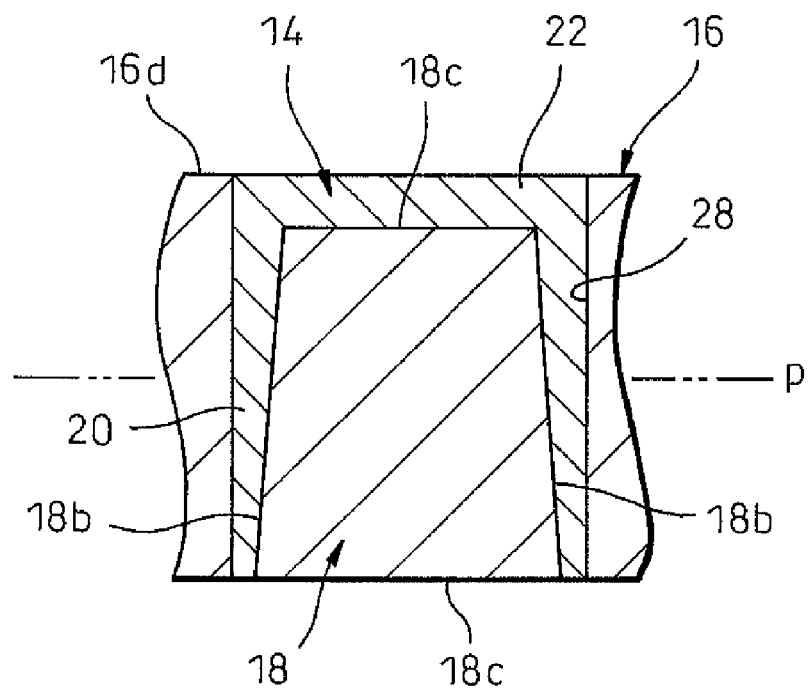
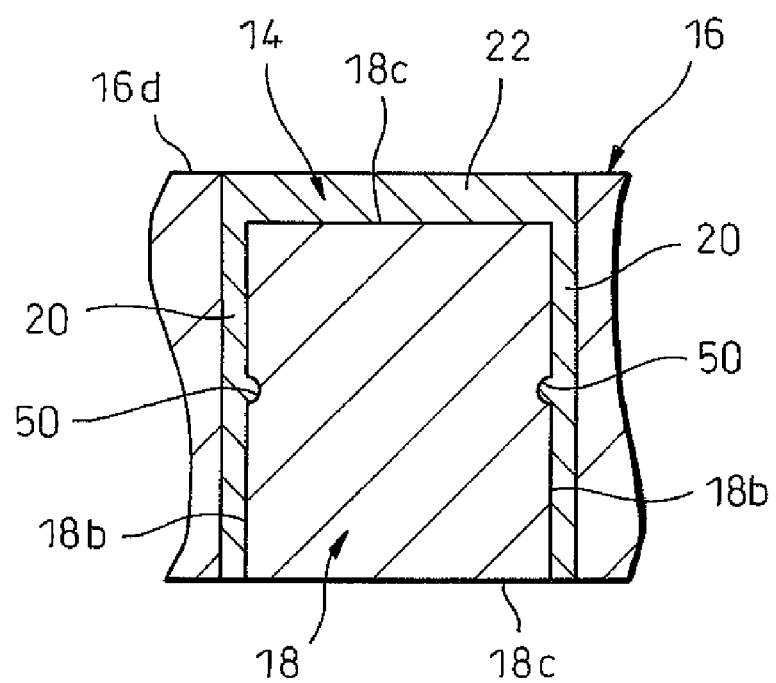

ELECTRIC MOTOR ROTOR AND METHOD OF MANUFACTURING THE SAME

BACKGROUND OF THE INVENTION

1. Field of the Invention

The present invention relates to a rotor of an electric motor. The present invention also relates to a method of manufacturing a rotor of an electric motor.

2. Description of the Related Art

In a rotor of an electric motor having a permanent-magnet field system (e.g., a synchronous motor), it is known that a plurality of permanent magnets are mounted in an embedded manner at predetermined positions in a cylindrical rotor core formed by stacking or laminating magnetic sheets such as silicon steel plates. The rotor of this type is typically manufactured by preliminarily forming a plurality of magnet-retaining apertures (typically, axially-extending through holes) in a predetermined circumferentially-distributed arrangement about a rotor shaft, each aperture having a profile substantially corresponding to a profile of each permanent magnet; inserting respectively the plurality of permanent magnets into the magnet-retaining apertures; and fixing each permanent magnet by an adhesive or an impregnant.

In the above-described conventional method for manufacturing a rotor, in the case where the adhesive is used for fixing the magnets, relatively complicated manual operations, such as the application of the adhesive to the permanent magnets, the removal of the surplus adhesive leaking from the magnet-retaining apertures, and the like, may be required. Also, in the case where an impregnant is used for fixing the magnets, relatively large-scale equipment tends to be required for an immersion process for immersing the rotor core in the impregnant, a heating process for solidifying the impregnant, etc., and thus the number of manufacturing steps tends to increase. On the other hand, it is also known that, as a rotor manufacturing method capable of resolving the above inconveniences, the rotor core is previously fabricated so that predetermined gaps are formed between respective magnet-retaining apertures and respective permanent magnets, and a resinous material is locally pored into the gaps and solidified therein, so as to fix the permanent magnets to the rotor core (e.g., see Japanese Unexamined Patent Publication (Kokai) No. 5-83892 (JP-A-5-083892)).

In the rotor manufacturing method disclosed in JP-A-5-083892, grooves (i.e., gaps) extending in an axial direction are formed adjacent to and in communication with the respective magnet-retaining apertures of a rotor core, and a molten resinous material is injected into the grooves and solidified therein by an injection molding technique, so as to fix the permanent magnets in the magnet-retaining apertures. In the injection molding process, a mold including a cavity for accommodating the rotor core and an injection molding machine onto which the mold can be installed are provided, and the rotor core receiving the permanent magnets in the respective magnet-retaining apertures is supported firmly and securely in the cavity of the mold. In this state, the resinous material is injected into the grooves of the rotor core under pressure by using an injection molding machine.

In the rotor manufacturing method adopting the injection molding technique set forth in the above-described JP-A-5-083892, by providing only the mold including the cavity for accommodating the rotor core and the injection molding machine onto which the mold can be installed, it is possible to easily and quickly perform a work for fixing the permanent magnets to the respective magnet-retaining apertures of the rotor core and, therefore, advantages are obtained wherein complicated manual operations when using an adhesive and large-scale equipment when using an impregnant are eliminated. However, when the rotor core is disposed in the cavity of the mold, any of the permanent magnets may be subjected to a positional deviation in the respective magnet-retaining apertures of the rotor core, or may be removed from or fall out of the magnet-retaining apertures. If the permanent magnet falls out of the rotor core, a work for rearranging or inserting the permanent magnet into the corresponding magnet-retaining aperture is required and, thereby, a rotor manufacturing operation may be delayed. Further, if the permanent magnet is subjected to the positional deviation in the magnet-retaining aperture, the resinous material poured into the gap is solidified in this state so that the magnetic and mechanical balance in the whole body of the manufactured rotor may become out of order, which may result in the degradation of the rotational accuracy of the rotor and, thereby, in the deterioration of the operational reliability of the electric motor.

SUMMARY OF THE INVENTION

It is an object of the present invention to provide a rotor of an electric motor, constituted by individually retaining a plurality of permanent magnets in a plurality of magnet-retaining apertures of a rotor core, wherein any of the permanent magnets can be surely prevented from being subjected to a positional deviation relative to, or from falling out of, the corresponding magnet-retaining aperture of the rotor core during the manufacturing process of the rotor and, therefore, high operational reliability can be ensured.

It is another object of the present invention to provide a method of manufacturing a rotor of an electric motor, constituted by individually retaining a plurality of permanent magnets in a plurality of magnet-retaining apertures of a rotor core, wherein any of the permanent magnets can be surely prevented from being subjected to a positional deviation relative to, or from falling out of, the corresponding magnet-retaining aperture of the rotor core during the manufacturing process of the rotor and, therefore, high operational reliability can be ensured.

To accomplish the above object, the present invention provides a rotor of an electric motor, comprising a rotor core having a plurality of magnet-retaining apertures; a plurality of permanent magnets individually received and retained in the plurality of magnet-retaining apertures of the rotor core; a resinous filler filling a gap defined between each of the magnet-retaining apertures and each of the permanent magnets and fixing the permanent magnets to the magnet-retaining apertures; and an engaging projection provided in the rotor core, the engaging projection tightly engaged with each of the plurality of permanent magnets received in the plurality of magnet-retaining apertures and temporarily holding each permanent magnet at a predetermined position in a corresponding magnet-retaining aperture, in an unfinished state of the rotor where the resinous filler is not arranged in the gap.

In the rotor configured as described above, the engaging projection may be formed adjacent to a first axial-end face of the rotor core and locally project inside each of the plurality of magnet-retaining apertures.

In this arrangement, the rotor core may comprise a laminated structure of a plurality of magnetic sheets, each of the plurality of magnet-retaining apertures extending to axially penetrate the plurality of magnetic sheets; and the engaging projection may be formed in one of the magnetic sheets defining the first axial-end face of the rotor core.

Also, the resinous filler may be arranged, in each of the plurality of magnet-retaining apertures, to cover each of the plurality of permanent magnets along a second axial-end face of the rotor core opposite to the first axial-end face.

Also, each of the plurality of permanent magnets may be provided with a first end surface disposed in close proximity to the first axial-end face of the rotor core and a second end surface disposed in close proximity to a second axial-end face of the rotor core opposite to the first axial-end face, and may be shaped in such a manner that a sectional area defined along a plane generally orthogonal to an axis of the rotor core gradually decreases in a direction from the first end surface toward the second end surface.

Also, each of the plurality of permanent magnets may be provided with a pair of lateral surfaces extending in a direction as to do not substantially intersect with a magnetic field formed by the permanent magnets, the gap being formed along each of the pair of lateral surfaces of each permanent magnet.

The present invention further provides a method of manufacturing a rotor of an electric motor, the rotor comprising a rotor core having a plurality of magnet-retaining apertures, a plurality of permanent magnets individually received and retained in the plurality of magnet-retaining apertures of the rotor core, and a resinous filler filling a gap defined between each of the magnet-retaining apertures and each of the permanent magnets and fixing the permanent magnets to the magnet-retaining apertures, the method comprising the steps of providing an unfinished rotor core in which a plurality of permanent magnets are individually received in a plurality of magnet-retaining apertures but a resinous filler is not arranged in a gap defined between each of the magnet-retaining apertures and each of the permanent magnets; providing a mold including a cavity for securely accommodating the unfinished rotor core and a plurality of gates opened to be opposed to exposed end surfaces of the plurality of permanent magnets in the rotor core accommodated in the cavity; pouring a molten resinous material into the cavity of the mold through the plurality of gates, at a pressure allowing the plurality of permanent magnets in the rotor core to be temporarily held at predetermined positions in the plurality of magnet-retaining apertures, and filling the gap defined between each magnet-retaining aperture of the rotor core and each permanent magnet with the molten resinous material; and solidifying the molten resinous material in the gap to form the resinous filler.

BRIEF DESCRIPTION OF THE DRAWINGS

The above and other objects, features and advantages of the present invention will become more apparent from the following description of preferred embodiments in connection with the accompanying drawings, wherein:

FIG. 1 is a perspective view showing a rotor of an electric motor, according to an embodiment of the present invention;

FIG. 7A is an illustration corresponding to FIG. 3A and showing a first modification of the rotor of FIG. 1; and FIG. 7B is an illustration corresponding to FIG. 3A and showing a second modification of the rotor of FIG. 1.

DETAILED DESCRIPTION

Figure 2A:
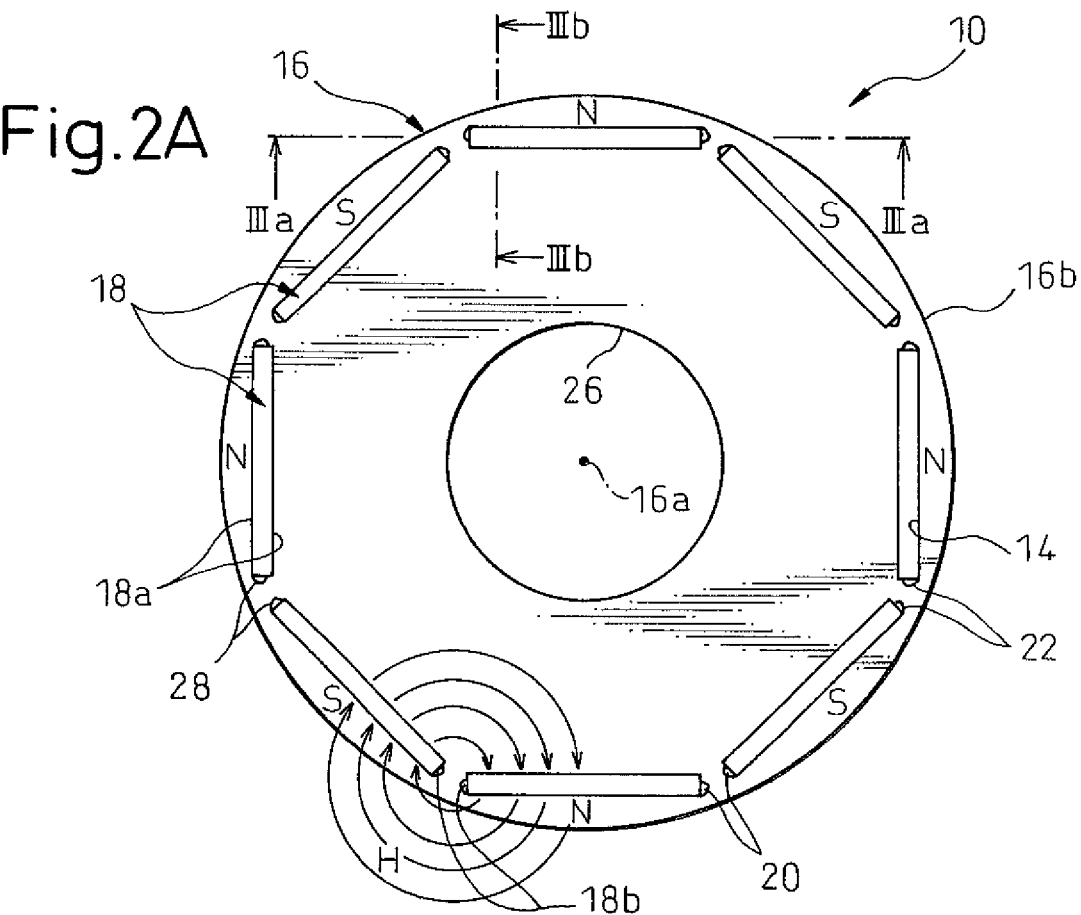
FIG. 2A is a plan view of the rotor of FIG. 1.

The embodiments of the present invention are described below, in detail, with reference to the accompanying drawings. In the drawings, the same or similar components are denoted by common reference numerals.

Figure 5:
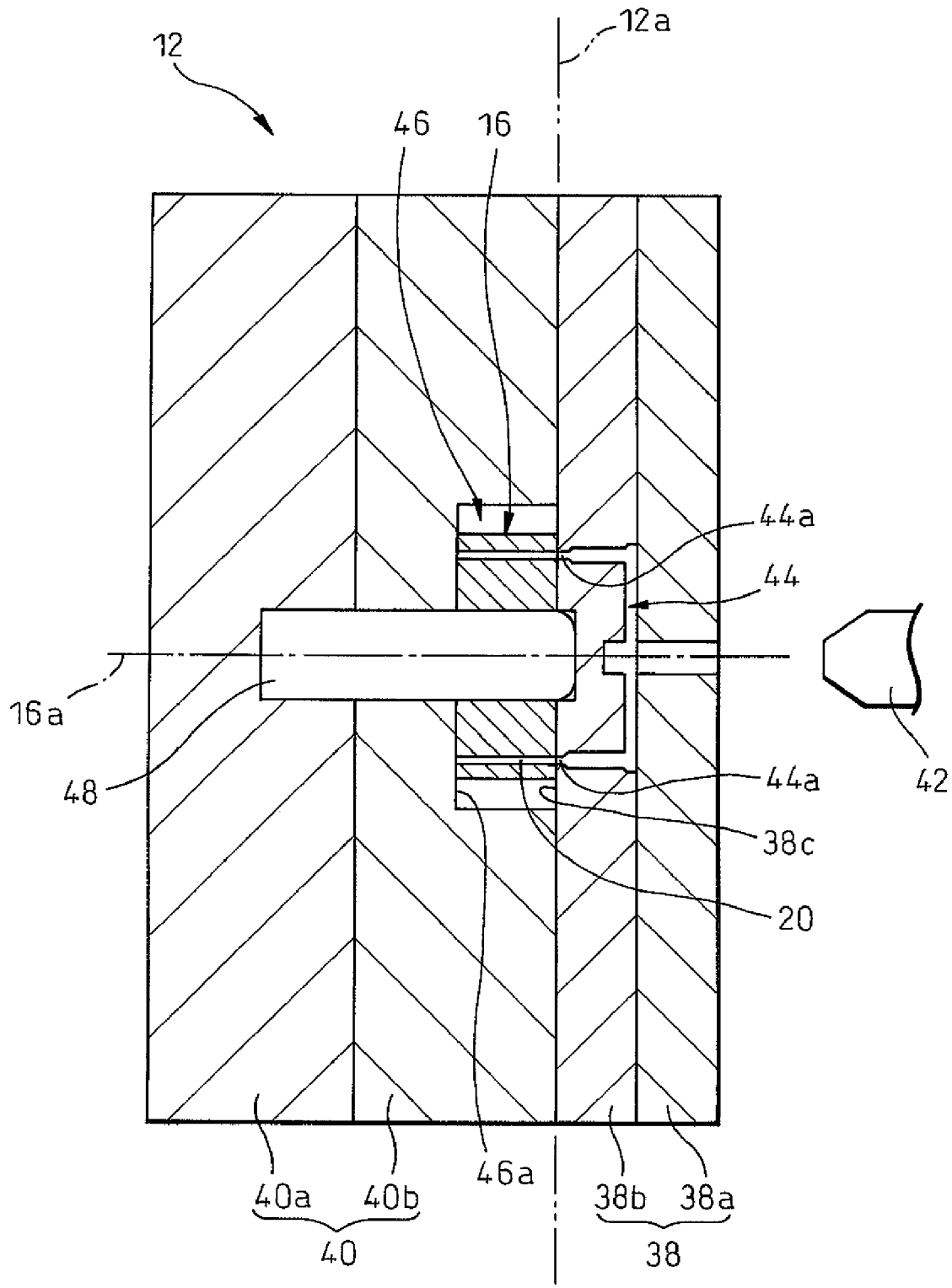
FIG. 5 is a sectional view showing a mold used for manufacturing the rotor of FIG. 1, with a rotor core being accommodated in a cavity.
Figure 6:
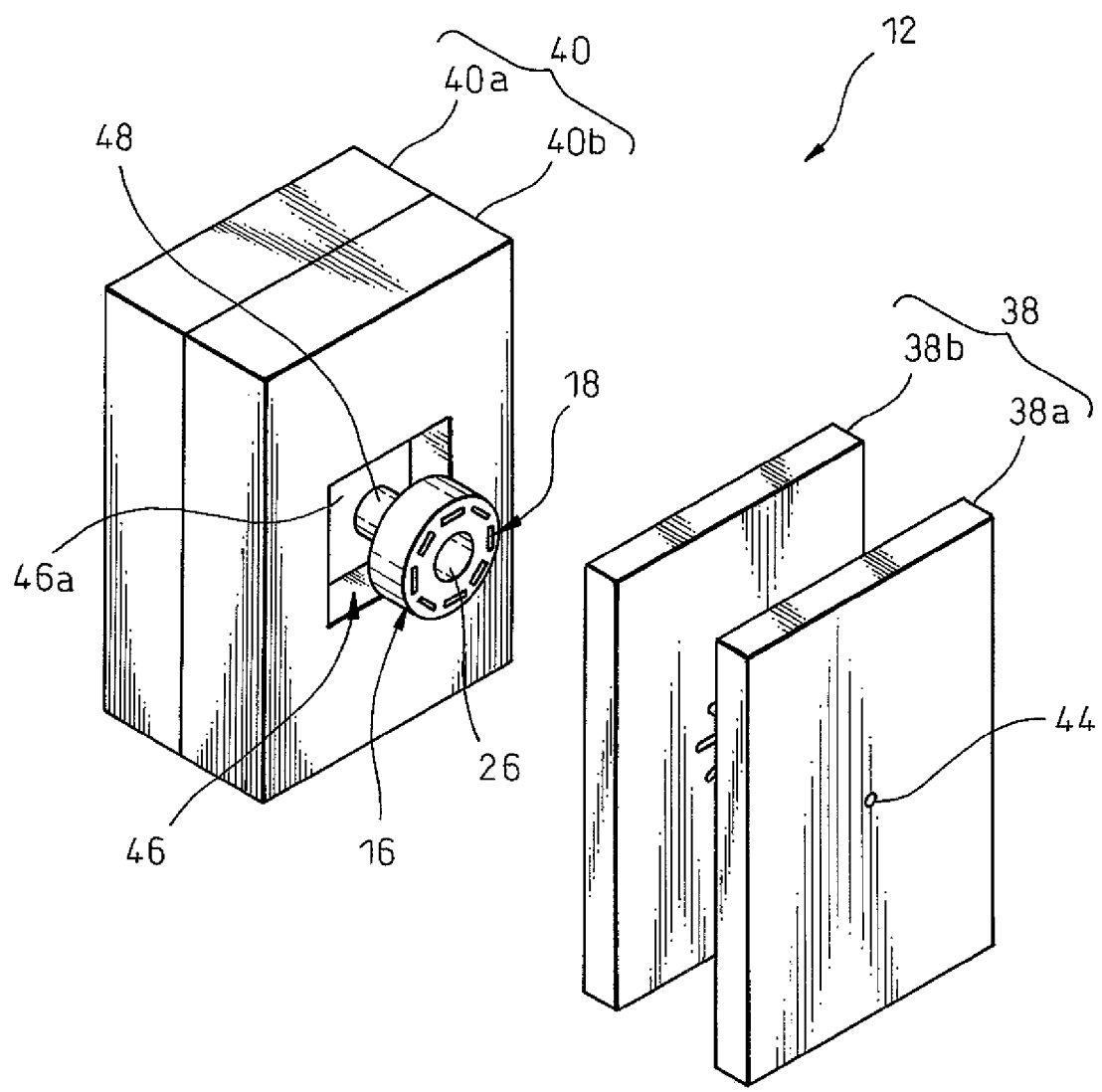
FIG. 6 is a perspective view showing the mold of FIG. 5 in an open state.

Referring to the drawings, FIGS. 1 to 4B are illustrations respectively showing a rotor 10 of an electric motor, according to an embodiment of the present invention, and FIGS. 5 and 6 are illustrations respectively showing a mold 12 used for manufacturing the rotor 10. The rotor 10 includes a rotor core 16 having a plurality of (eight, in the drawing) magnet-retaining apertures 14, a plurality of (eight, in the drawing) permanent magnets 18 individually received and retained in the plurality of magnet-retaining apertures 14 of the rotor core 16, and a resinous filler 22 filling a gap 20 defined between each of the magnet-retaining apertures 14 and each of the permanent magnets 18 and fixing the permanent magnets 18 to the magnet-retaining apertures 14.

The rotor core 16 is a substantially cylindrical member formed by stacking or laminating magnetic sheets 24, such as silicon steel plates, and is provided at a center thereof with a shaft hole 26 penetrating therethrough along an axis 16a (FIG. 1). The plurality of magnet-retaining apertures 14 are formed respectively as axially-extending through holes, and are disposed in proximity to an outer circumferential surface 16b of the rotor core 16 and in a predetermined, circumferentially regular-interval arrangement about the axis 16a. Each of the magnet-retaining apertures 14 has a slot-like profile substantially corresponding to a tabular profile of the permanent magnet 18 as to be retained.

The rotor core 16 is attached to a shaft (not shown) at the shaft hole 26 by, for example, a shrinkage fit, with the permanent magnets 18 being securely retained in the respective magnet-retaining apertures 14. The rotor 12 having the shaft is rotatably supported on a housing (not shown) in a state where the outer circumferential surface 16b of the rotor core 16 opposes a stator (not shown) with a predetermined air-gap defined therebetween, whereby an electric motor is constituted.

Each of the permanent magnets 18 has a flat shape which is substantially rectangular as seen in a plan view, and is provided with a pair of substantially-flat major surfaces 18a extending in parallel with each other, a pair of lateral surfaces 18b connecting the major surfaces 18a with each other, and a pair of end surfaces 18c extending substantially orthogonally to the major surfaces 18a and the lateral surfaces 18b. Each permanent magnet 18 is magnetized or polarized in a thickness direction so as to form N and S poles respectively in the pair of major surfaces 18a. The permanent magnets 18 are individually inserted into the corresponding magnet-retaining apertures 14 in an alternate arrangement where the mutually-different magnetic poles of the permanent magnets 18 disposed side-by-side in a circumferential direction are oriented toward the outer circumferential surface 16b of the rotor core 16. In this state, magnetic poles corresponding to those of the nearest permanent magnets 18 are formed on the outer circumferential surface 16b of the rotor core 16 in a circumferentially alternate arrangement (FIG. 2A). Also, in this state, the lateral surfaces 18b of each permanent magnet 18 are disposed to extend in a direction as to do not substantially intersect with a magnetic field H formed by the permanent magnets 18.

Figure 2B:
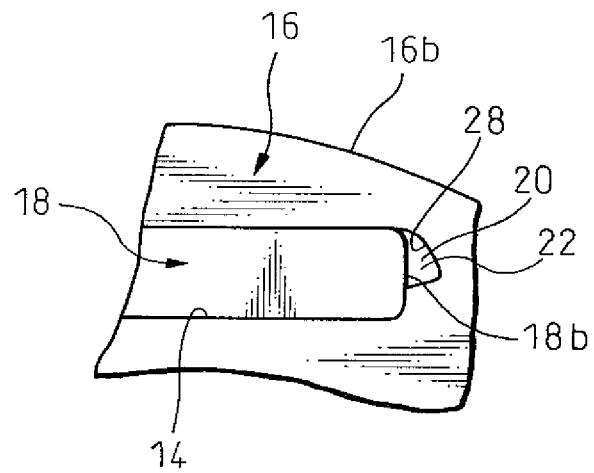
FIG. 2B is an enlarged view of a major portion of the rotor of FIG. 1.

Each of the magnet-retaining apertures 14 is provided with a pair of grooves 28 continuously extending in the axial direction of the rotor core 16 and formed at longitudinally opposite ends of each aperture 14 as seen in the plan view of FIG. 2A. The grooves 28 of each magnet-retaining aperture 14 are disposed to respectively oppose to the lateral surfaces of the permanent magnet 18 received in the aperture 14, so as to form gaps 24 having predetermined shapes along the magnet lateral surfaces 18b between the magnet-retaining aperture 14 and the permanent magnet 18 (FIG. 2B). The resinous filler 22 is formed in each of the gaps 20 by, for example, an injection molding process using the mold 12 as described later. In this configuration, the resinous filler 22 for fixing each permanent magnet 18 at a predetermined position in the corresponding magnet-retaining aperture 14 is arranged along the lateral surfaces 18b extending in the direction as to do not substantially intersect with the magnetic field H of each permanent magnet 18, so that influences on the magnetic properties of the rotor 10 can be effectively reduced.

The rotor 10 further includes, as a characteristic arrangement of the present invention, an engaging projection 30 provided in the rotor core 16, the engaging projection 30 being tightly engaged with each of the plurality of permanent magnets 18 respectively received in the plurality of magnet-retaining apertures 14 and temporarily holding each permanent magnet 18 at a predetermined position in a corresponding magnet-retaining aperture 14, in a semi-finished or unfinished state of the rotor 10 where the resinous filler 22 is not arranged in the gap 20. The engaging projection 30 is formed adjacent to a first axial-end face 16c of the rotor core 16 and locally projects inside each magnet-retaining aperture 14 (FIG. 3B). In this connection, the "temporarily holding" action of the engaging projection 30 should be considered to securely hold the permanent magnet 18 until the resinous filler 22 is arranged in the gap 20 of the rotor core 16 and, therefore, it should not always be assumed that the magnet holding effect of the engaging projection 30 is lost after the resinous filler is arranged in the gap 20.

Figure 3A:
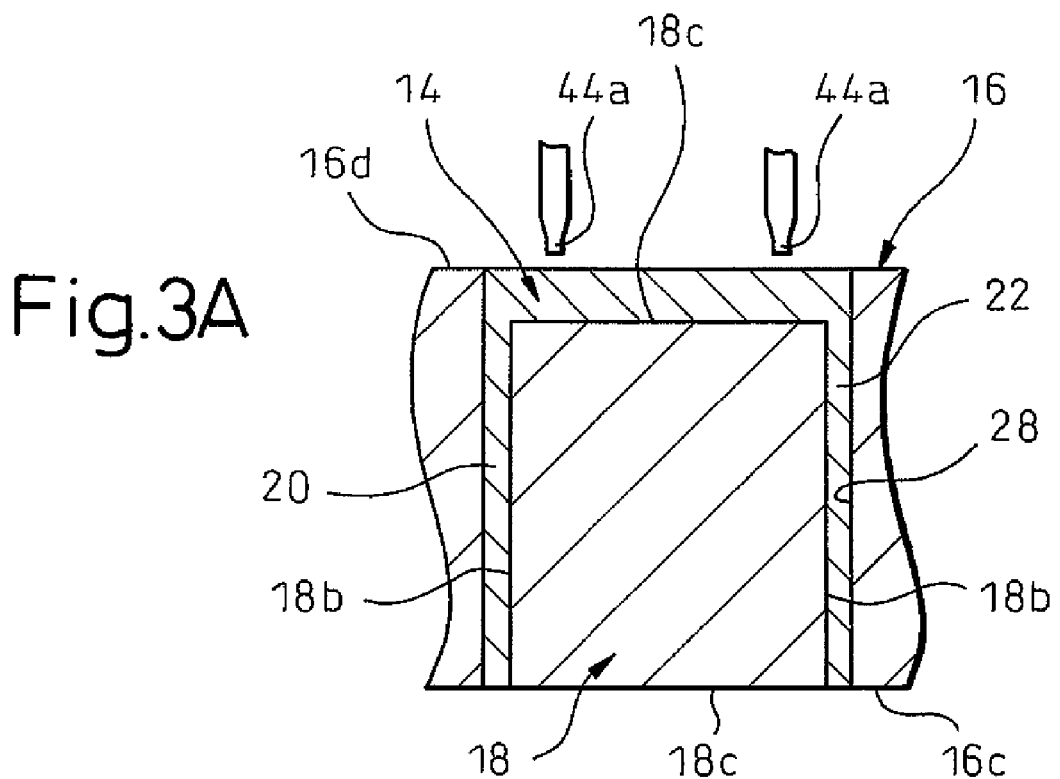
FIG. 3A is a sectional view of a major portion of the rotor, taken along a line IIIa-IIIa in FIG. 2A.
Figure 3B:
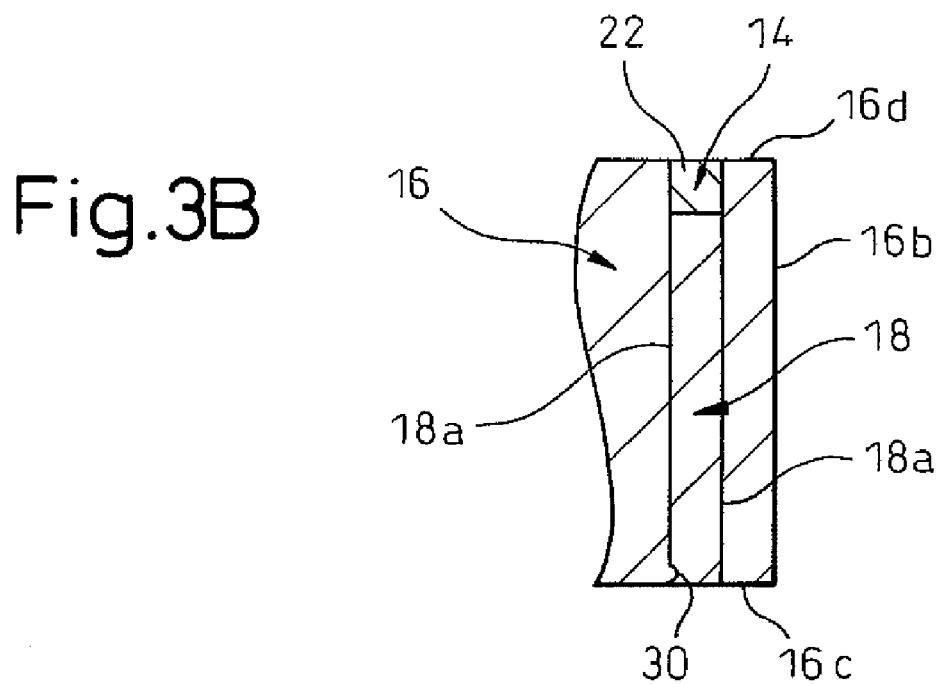
FIG. 3B is a sectional view of a major portion of the rotor, taken along a line IIIb-IIIb in FIG. 2A.
Figure 4A:
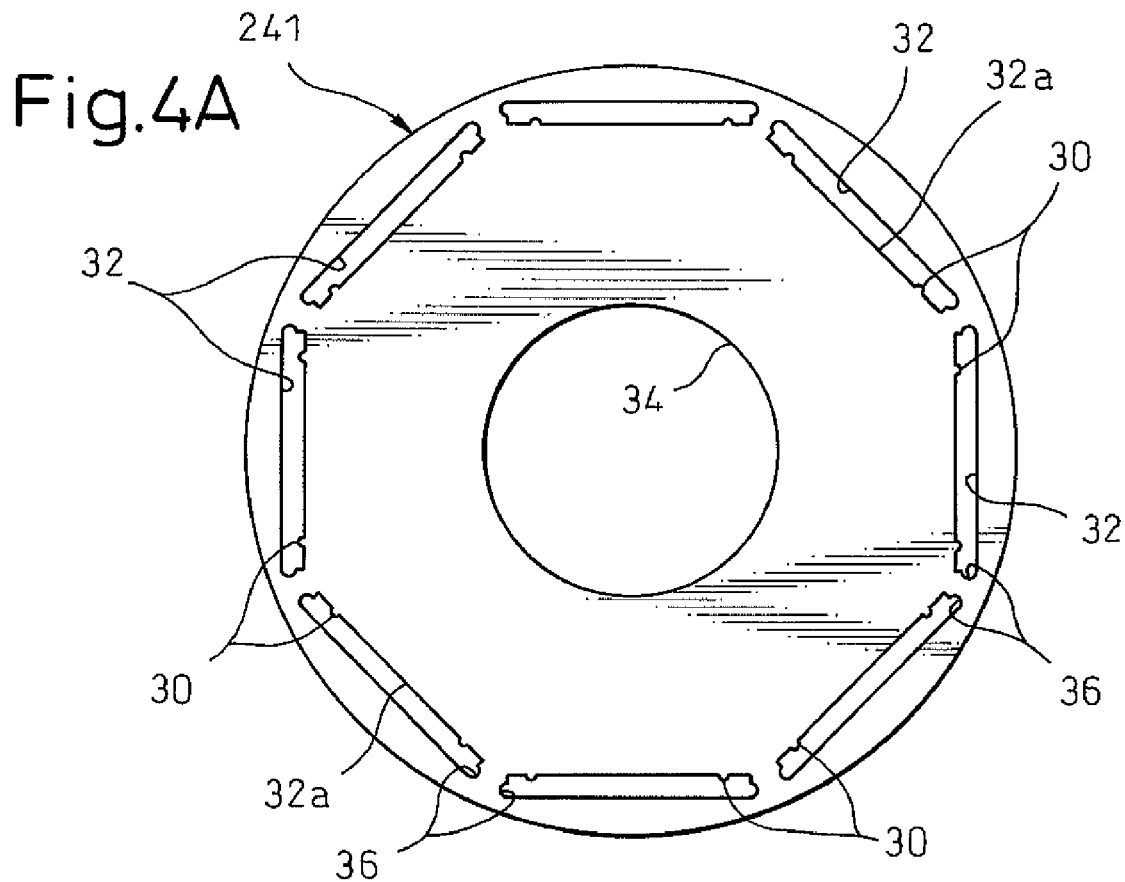
FIG. 4A is a plan view of one of magnetic sheets constituting the rotor of FIG. 1.
Figure 4B:
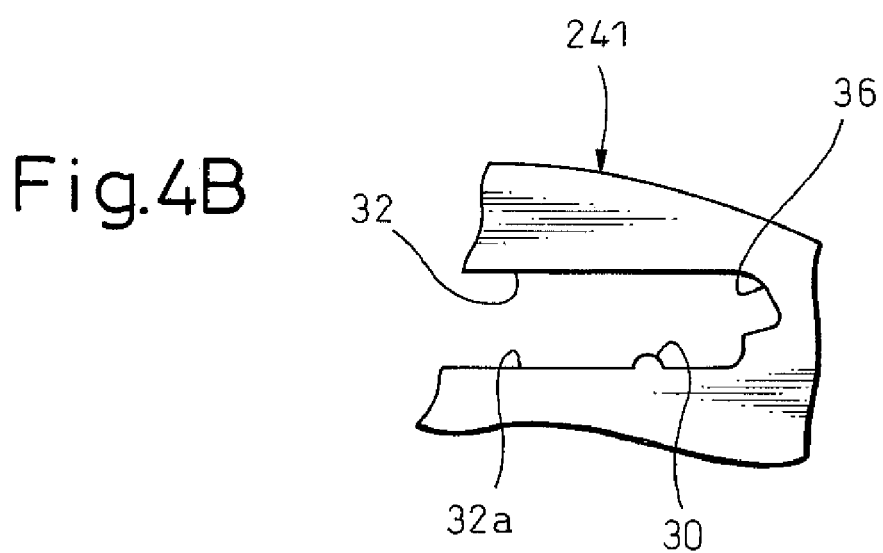
FIG. 4B is an enlarged view of a major portion of one of magnetic sheets constituting the rotor of FIG. 1.

In the illustrated embodiment, each of the magnet-retaining apertures 14 extends to axially penetrate all of the magnetic sheets 24 constituting the rotor core 16 (FIG. 3A). The engaging projection 30 is formed in one magnetic sheet 241 (FIG. 1), among all magnetic sheets, which defines the first axial-end face 16c of the rotor core 16. More specifically, with reference to FIGS. 4A and 4B, the magnetic sheet 241 is provided with a plurality of first hole elements 32 respectively constituting the magnet-retaining apertures 14 (FIG. 1) in the laminated structure of the magnetic sheet 241 and the other plurality of magnetic sheets 24, and a second hole element 34 constituting the shaft hole 26 (FIG. 1) in the above laminated structure, wherein the first hole elements 32 and the second hole element 34 are formed in a predetermined relative arrangement to penetrate the magnetic sheet 241 in a thickness direction, and wherein each of the first hole elements 32 is provided with a pair of groove elements 36 respectively constituting the grooves 28 (FIG. 1) in the above laminated structure. Further, each first hole element 32 is provided with a pair of engaging projections 30 formed to be spaced from each other and to locally project inside the first hole element 32, at positions adjacent to the respective groove elements 36 and on a radially inner side 32a located near the second hole element 34.

Next, with reference to FIGS. 5 and 6, the configuration of the mold 12 used for manufacturing the above-described rotor 10 will be described. The mold 12 is constructed from a mutually-combined pair of mold members 38, 40 separable from each other at a parting line 12a, and is mounted on, for example, a mold clamping mechanism of the injection molding machine (not shown) with one mold member 38 being carried on a stationary platen (not shown) and the other mold member 40 being carried on a movable platen (not shown). The mold member 38 at a stationary side is provided with a material passage (including a sprue, a runner and a gate) 44, for distributing the flow of the molten resinous material in predetermined directions, which is supplied from an injection mechanism (a part of a nozzle 42 is shown) of the injection molding machine. On the other hand, the mold member 32 at a movable side is provided with a cavity 46 for securely accommodating, at a predetermined position, the aforesaid unfinished rotor core 16 in which the permanent magnets 18 are individually received in the magnet-retaining apertures 14.

The material passage 44 of the mold member 38 is configured in such a manner that the molten resinous material can be appropriately distributed and poured into each of the plurality of gaps 20 defined between the magnet-retaining apertures 14 and the permanent magnets 18 in the rotor core 16 disposed at a position in the cavity 46 proper for a pouring of the resinous material. The mold member 38 has a known two-piece structure (i.e., a first element 38a and a second element 38b) for removing the resinous material solidified in the material passage 44. The second element 38b of the mold member 38 has an end face 38c constituting the parting line 12a, and a plurality of gates 44a of the material passage 44 are opened in the end face 38c.

On the other hand, the mold member 40 has a known two-piece structure (i.e., a first element 40a and a second element 40b) for incorporating thereto an ejector mechanism (not shown) and the like. The mold member 40 is provided with a centering support element 48 extending into the cavity 46 (and fixed to the first element 40a, in the drawing). The centering support element 48 is shaped and dimensioned to be fittable into the shaft hole 26 of the rotor core 16 with no wobbling, and locates the rotor core 16, accommodated in the cavity 46, at the proper position for the pouring of the resinous material with reference to the axis 16a.

A bottom surface (i.e., an axial end face) 46a of the cavity 46 of the mold member 40 cooperates with the end face 38c of the second element 38b of the mold member 38 to firmly and securely hold the rotor core 16 accommodated in the cavity 46. In this situation, the cavity bottom surface 46a of the mold member 40 is tightly abutted against the first axial-end face 16c of the rotor core 16 (FIG. 3A) and thereby acts as a forming surface 46a hermetically closing openings at the axial ends of the gaps 20 formed between the respective magnet-retaining apertures 14 and the respective permanent magnets 18.

In the manufacturing process of the rotor 10, by using the above-described mold 12, the molten resinous material is poured into the gaps 24 between the respective magnet-retaining apertures 14 formed in the rotor core 16 and the respective permanent magnets 18 at a required high injection pressure. The molten resinous material poured into the gaps 20 under the required injection pressure entirely fills up the gaps 20, so as to firmly and mechanically couple the rotor core 16 with the permanent magnets 18. In this connection, the resinous material molded in the gaps 20 is preferably selected from engineering plastics that have excellent fluidity and mechanical strength.

In the rotor 10 configured as described above, by providing the mold 12 including the cavity 46 for accommodating the rotor core 16, it is possible to easily and quickly perform a work for fixing the permanent magnets 18 to the respective magnet-retaining apertures 14 of the rotor core 16 by using a resin molding machine such as an injection molding machine and, therefore, advantages are obtained wherein complicated manual operations when using an adhesive and large-scale equipment when using an impregnant, required in the conventional manufacturing process of a rotor, are eliminated. Moreover, the rotor 10 is configured in such a manner that, when the rotor core 16 is in the unfinished state in which the resinous filler 22 is not arranged in the gaps 20, the engaging projections 30 formed in the rotor core 16 are tightly engaged with the respective permanent magnets 18 received in the magnet-retaining apertures 14 so as to temporarily hold the permanent magnets 18 at the predetermined positions in the corresponding magnet-retaining apertures 14, so that in a work for placing the rotor core 16 within the cavity 46 of the mold 12, it is possible to surely prevent any of the permanent magnets 18 from being subjected to a positional deviation relative to, or from falling out of, the corresponding magnet-retaining apertures 14 of the rotor core 16.

As a result, according to the rotor 10, it is possible to smoothly perform the rotor manufacturing process in high accuracy, to ensure the magnetic and mechanical balance in the whole body of the manufactured rotor 10 and maintain the rotational accuracy of the rotor 10 at a high level, and thus to provide a high operational reliability for an electric motor. In this connection, the above characteristic effects obtained by the engaging projection 30 show particular advantages such that an automatic operation can be smoothly performed in a work for inserting the rotor core 16 into the cavity 46 of the mold 12 by an automatic machine such as a robot and the like (not shown).

Further, according to the configuration wherein the engaging projection 30 is formed adjacent to the first axial-end face 16c of the rotor core 16 to locally project inside each magnet-retaining aperture 14, it is possible to facilitate the insertion of the permanent magnets 18 into the magnet-retaining apertures 14 and to effectively reduce the damage of the permanent magnets 18 that may otherwise occur upon the insertion. In particular, according to the configuration wherein the engaging projection 30 is formed in one magnetic sheet 24₁ defining the first axial-end face 16c of the rotor core 16 formed by laminating the magnetic sheets 24, it is possible to easily and accurately form the engaging projection 30.

It should be noted that the engaging projection 30 as a characteristic component of the present invention may be applied not only to the rotor core 16 having the laminated structure but also to a rotor core having a monolithic body of a magnetic material. Also, a various number of engaging projections 30 may be formed at various positions in each magnet-retaining aperture 14. In the case where the engaging projections 30 are provided in the single magnetic sheet 24₁, it is possible to shape each of the first hole elements 32 as to be slightly smaller than the corresponding first hole elements 32 of the other magnetic sheets 24, so as to form the engaging projection 30 projecting inside each magnet-retaining aperture 14 in a wedge-like manner.

In the rotor 10 configured as described above, various means may be optionally adopted for helping to enhance the temporarily holding action of the engaging projection 30 for the permanent magnet 18. For example, as shown in FIGS. 3A and 3B, the resinous filler 22 may be arranged, in each of the magnet-retaining apertures 14, to cover one of the end surfaces 18c of each permanent magnet 18 along a second axial-end face 16d of the rotor core 16 opposite to the first axial-end face 16c adjacent to the engaging projection 30. This configuration can be established by making the dimension of each permanent magnet 18 somewhat smaller than that of the rotor core 16 in the axial direction. According to this configuration, in addition to the temporarily holding action of the engaging projection 30, the resinous filler 22 arranged at the side opposite to the engaging projection 30 in each magnet-retaining aperture 14 acts to inhibit the movement of the permanent magnet 18 in a direction falling out of the magnet-retaining aperture 14, whereby it is possible to increase the fixing strength of the permanent magnet 18 relative to the rotor core 16.

In the manufacturing process of the rotor 10 as shown in FIG. 3A, it is advantageous that the material passage 44 in the mold 12 shown in FIG. 5 is formed in such a manner that the gates 44a are opened to be opposed to the exposed end surfaces 18c (i.e., the end surfaces located to be slightly retracted into the magnet-retaining apertures 14 at the side opposite to the engaging projections 30) of the permanent magnets 18 in the unfinished rotor core 16 accommodated in the cavity 46 (FIG. 3A). According to this configuration, when the molten resinous material is poured into the cavity 46 of the mold 12 through the gates 44a, the molten resinous material first collides against the exposed end surfaces 18c of the permanent magnets 18. Therefore, by setting the injection pressure of the molten resinous material at a level allowing the respective permanent magnet 18 to be temporarily held at the predetermined positions in the corresponding magnet-retaining apertures 14, it is possible to accurately fill the gaps 20 between the magnet-retaining apertures 14 and the permanent magnets 18 with the molten resinous material while maintaining the state where the permanent magnets 18 are stably held at the predetermined positions without inhibiting the temporarily holding action of the engaging projections 30. It should be noted that the above-described rotor manufacturing method may also be effectively performed for a rotor that does not include the engaging projection 30 in the rotor core 16.

Further, as shown in FIG. 7A, each permanent magnet 18 may be configured to have a so-called tapered shape in which a sectional area defined along a virtual plane P generally orthogonal to the axis 16a (FIG. 1) of the rotor core 16 gradually decreases in a direction from the first end surface 18c disposed in close proximity to the first axial-end face 16c of the rotor core 16 toward the second end surface 18c disposed in close proximity to the second axial-end face 16d of the rotor core 16. According to this configuration, in addition to the temporarily holding action of the engaging projection 30, the resinous filler 22 in each magnet-retaining aperture 14 acts on the lateral surfaces 18b of each permanent magnet 18 in a wedge-like manner so as to inhibit the movement of the permanent magnet 18 in the direction falling out of the magnet-retaining aperture 14, whereby it is possible to increase the fixing strength of the permanent magnet 18 relative to the rotor core 16.

Still further, as shown in FIG. 7B, a recess 50 having an arbitrary shape may be locally formed at a desired position on each of the lateral surfaces 18b of each permanent magnet 18. According to this configuration, a part of the resinous filler 22 filling each gap 20 is arranged in each recess 50, whereby it is possible to increase the fixing strength of the permanent magnet 18 relative to the rotor core 16 obtained by the resinous filler 22.

As will be understood from the above description, according to the present invention, a rotor is configured in such a manner that, when a rotor core is in a semi-finished or unfinished state in which a resinous filler is not arranged in gaps, an engaging projection formed in the rotor core is tightly engaged with respective permanent magnets received in magnet-retaining apertures so as to temporarily hold the permanent magnets at the predetermined positions in the corresponding magnet-retaining apertures. Therefore, in a work for placing the rotor core within a cavity of a mold, it is possible to surely prevent any of the permanent magnets from being subjected to a positional deviation relative to, or from falling out of, the corresponding magnet-retaining apertures of the rotor core. As a result, it is possible to smoothly perform the rotor manufacturing process in high accuracy, to ensure a magnetic and mechanical balance in the whole body of the manufactured rotor and maintain the rotational accuracy of the rotor at a high level, and thus to provide a high operational reliability for an electric motor.

While the invention has been described with reference to specific preferred embodiments, it will be understood, by those skilled in the art, that various changes and modifications may be made thereto without departing from the scope of the following claims.

The invention claimed is:

1. A rotor of an electric motor, comprising:
a rotor core having a plurality of magnet-retaining apertures;
a plurality of permanent magnets individually received and retained in said plurality of magnet-retaining apertures of said rotor core;
a resinous filler filling a gap defined between each of said magnet-retaining apertures and each of said permanent magnets and fixing said permanent magnets to said magnet-retaining apertures; and
an engaging projection provided in said rotor core, said engaging projection tightly engaged with a portion of each of said plurality of permanent magnets received in said plurality of magnet-retaining apertures;
wherein said engaging projection is formed only at a location adjacent to a first axial-end face of said rotor core, projects inside each of said plurality of magnet-retaining apertures, does not extend a whole length of the magnet-retaining aperture, and tightly engages only a first axial-end portion of a finally received permanent magnet;
wherein each of said plurality of permanent magnets has a dimension smaller than a dimension of said rotor core as seen in an axial direction of said rotor core, and is provided with a first end surface disposed in close proximity to said first axial-end face of said rotor core and a second end surface disposed to be retracted into each of said plurality of magnet-retaining apertures from a second axial-end face of said rotor core opposite to said first axial-end face; and
wherein said resinous filler is arranged, in each of said plurality of magnet-retaining apertures, to cover said second end surface of each of said plurality of permanent magnets and to fill said gap, by using a mold of an injection molding machine, the mold being formed in such a manner that each of a plurality of gates is opened to be opposed to said second end surface of each of said plurality of permanent magnets.

2. A rotor as set forth in claim 1, wherein said rotor core comprises a laminated structure of a plurality of magnetic sheets, each of said plurality of magnet-retaining apertures extending to axially penetrate said plurality of magnetic sheets; and wherein said engaging projection is formed in one of said magnetic sheets defining said first axial-end face of said rotor core.

3. A rotor as set forth in claim 1, wherein each of said plurality of permanent magnets is shaped in such a manner that a sectional area defined along a plane generally orthogonal to an axis of said rotor core gradually decreases in a direction from said first end surface toward said second end surface.

4. A rotor as set forth in claim 1, wherein each of said plurality of permanent magnets is provided with a lateral surface extending in a magnetized direction of said permanent magnets, said gap being formed along said lateral surface of each permanent magnet.

5. A rotor as set forth in claim 4, wherein each of said plurality of permanent magnets is provided with a recess locally formed on said lateral surface, a part of said resinous filler filling said gap being arranged in said recess.

* * * * *